United States Patent
Prusia et al.

(10) Patent No.: US 7,663,663 B2
(45) Date of Patent: Feb. 16, 2010

(54) BURN-IN CONTROL

(75) Inventors: Christian Prusia, Portland, OR (US);
Willie Thomas Glover, Tualatin, OR (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 11/796,242

(22) Filed: Apr. 26, 2007

(65) Prior Publication Data

US 2008/0106649 A1 May 8, 2008

Related U.S. Application Data

(60) Provisional application No. 60/795,856, filed on Apr. 28, 2006.

(51) Int. Cl.
*H04N 3/20* (2006.01)

(52) U.S. Cl. .................. 348/173; 348/377; 345/690; 715/867

(58) Field of Classification Search ............. 348/173, 348/377, 378; 345/690, 63; 715/867
See application file for complete search history.

(56) References Cited

U.S. PATENT DOCUMENTS

| | | | |
|---|---|---|---|
| 6,313,878 B1 * | 11/2001 | Jankowiak | ............... 348/377 |
| 6,757,022 B2 | 6/2004 | Wredenhagen et al. | |
| 6,856,328 B2 * | 2/2005 | Holtslag | ............... 345/690 |
| 6,868,189 B1 | 3/2005 | Hoshino | |
| 7,158,169 B1 * | 1/2007 | Farber et al. | ............... 348/173 |
| 2005/0063586 A1 | 3/2005 | Munsil et al. | |
| 2005/0157171 A1 * | 7/2005 | Bowser | ............... 348/174 |
| 2006/0001601 A1 * | 1/2006 | Ono | ............... 345/60 |
| 2007/0058042 A1 * | 3/2007 | Farber et al. | ............... 348/173 |

OTHER PUBLICATIONS

ISA US, International Search Report of PCT/US07/10365, Aug. 5, 2008, WIPO, 2 pages.

* cited by examiner

*Primary Examiner*—M. Lee
(74) *Attorney, Agent, or Firm*—Alleman Hall McCoy Russell & Tuttle LLP

(57) ABSTRACT

A burn-in control method and video processor for executing the same. The video processor intelligently recognizes aspects of a video image that are likely to cause burn-in, and responsive to such recognition, modifies the video image to prevent uneven aging of the pixels. According to one aspect of the disclosure, modifications are spatially made to an entire video frame, one or more selected regions of a video frame, or one or more individual pixels of a video frame. According to another aspect of the disclosure, modifications are temporally made to all frames in a video stream, selected frames in a video stream, or a single frame in a video stream.

17 Claims, 4 Drawing Sheets

BURN-IN CONTROL

CROSS REFERENCE TO RELATED APPLICATIONS

This application claims the benefit of U.S. Provisional Application No. 60/795,856, filed Apr. 28, 2006, which is incorporated by reference.

BACKGROUND

Video images are often presented on a display in a manner that can damage the display. In particular, some types of displays are sensitive to a static image being displayed at the same display location for extended periods of time. Static images can cause an uneven aging of the individual pixels of a display, and this can result in some images remaining permanently visible on the display. This phenomenon can be referred to as burn-in. Burn-in is prevalent on plasma displays, although it can affect other display technologies as well. Displays are especially susceptible to burn-in when used to present program guides, heads-up-displays (HUDS), station identifiers (bugs), programming menus (e.g., DVD menus), device menus (e.g., DVR menus, television setup menus, satellite menus, etc.), letterboxing, ticker tape, scoreboards, and sport tickers, or when the display is paused to present the same image for an extended period of time.

SUMMARY

The inventor herein has recognized that burn-in can be reduced, if not eliminated altogether, by intelligently recognizing aspects of a video image that are likely to cause burn-in, and responsive to such recognition, modifying the video image to prevent uneven aging of the pixels. Modifications can be spatially made to an entire video frame, one or more selected regions of a video frame, or one or more individual pixels of a video frame. Modifications can be temporally made to all frames in a video stream, selected frames in a video stream, or a single frame in a video stream.

BRIEF DESCRIPTION OF THE DRAWINGS

FIGS. 5A-10C schematically demonstrate exemplary video image modifications for limiting burn-in.

WRITTEN DESCRIPTION

Figure 1:
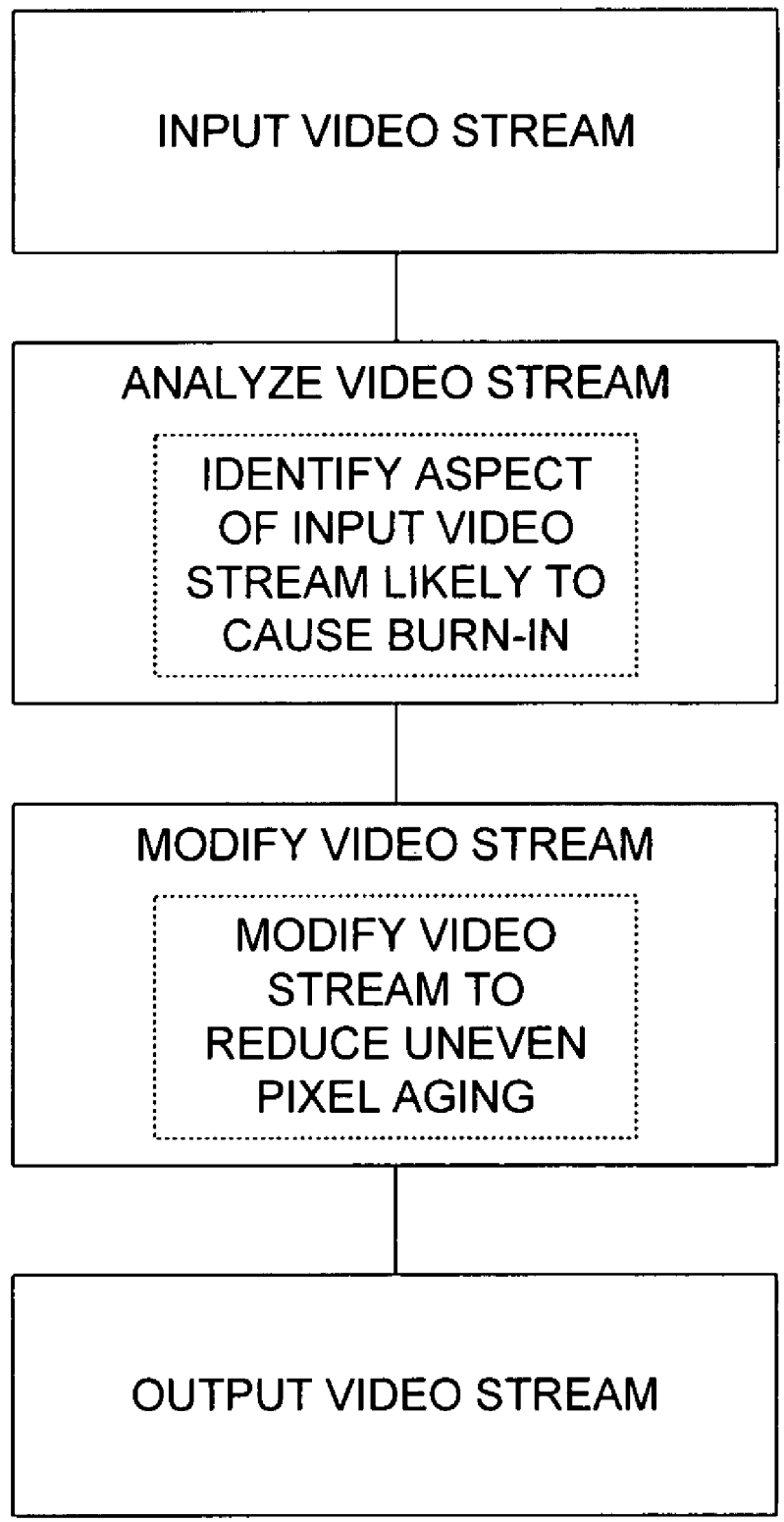
FIG. 1 is a flow-chart showing a burn-in reduction strategy.

The present disclosure is directed to a burn-in reduction strategy and to methods and systems for implementing such a strategy. As demonstrated by the flow chart of FIG. 1, the burn-in reduction strategy can be conceptually divided into four phases: 1) inputting a video stream; 2) analyzing the video stream; 3) modifying the video stream; and 4) outputting the video stream.

Video Input

A video stream can be received by a device that is configured to process the video stream and output it for display. Such a device can be either physically located upstream of a display or integrated into the display. The device can be implemented as a collection of separate processing units that perform different video processing operations, or the device can be implemented as a single device (e.g., an integrated circuit) that is configured to perform a plurality of different video processing operations. For purposes of this disclosure, all such devices, whether comprising a single integrated circuit or a collection of different devices, can be referred to as "video processors." A video processor can include a tuner and one or more decoder circuits, as well as one or more functional logic-blocks configured to process different aspects of a video stream and/or modify the video stream in different manners. The logic-blocks can be implemented as hardware, firmware, software, or a combination thereof, on one or more devices. For example, in one embodiment, analysis logic and modification logic may be implemented on a single integrated circuit; and in another embodiment, analysis logic and modification logic can be implemented as software routines that are executed by a central processing unit.

A video stream can be input to a video processor from a variety of different content sources in a variety of different digital or analog formats. A nonlimiting list of content sources includes media players (e.g., DVD, DVR, VCR, V-CD, etc.), over-the-air broadcasts, satellite broadcasts, cable broadcasts, and computer network broadcasts, podcasts, and streams (e.g., over a WAN, LAN, PAN, and/or MAN). A nonlimiting list of content-source formats includes MPEG-1, MPEG-2, MPEG-4, and DivX. It should be understand that the herein described burn-in reduction strategy can be adapted to content sources and content-source formats other than those listed above.

Video Analysis

Figure 2:
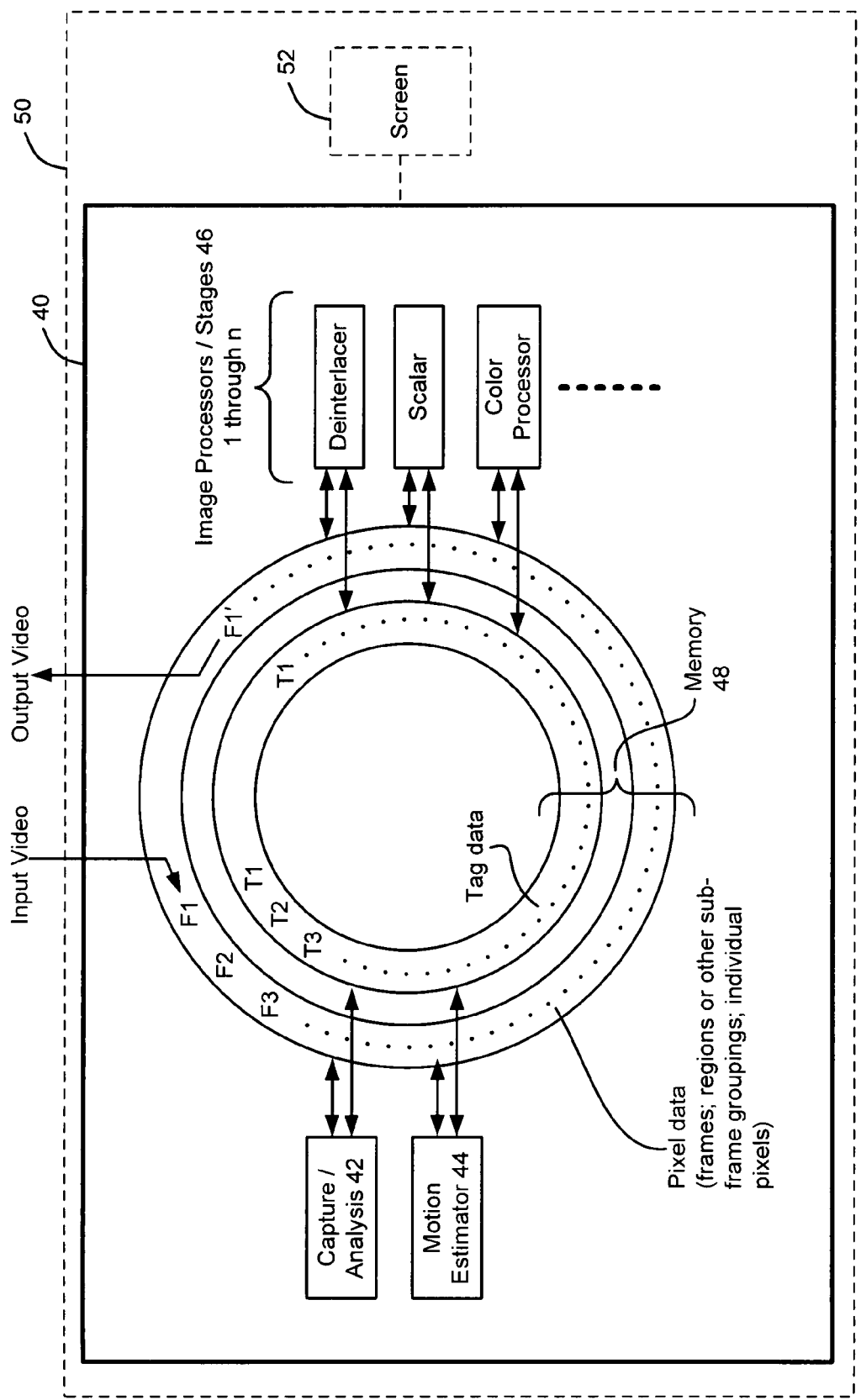
FIG. 2 schematically shows a tag-based technology for processing a video stream.

FIG. 2 schematically shows a high-level conceptualization of how a video stream can be analyzed and modified using a tag-based approach in which information corresponding to the actual pixel values is used to intelligently process the video stream. FIG. 2 shows a video processor 40 that is configured to process an input video stream received from a suitable content source. Although not required in all embodiments, video processor 40 can be a constituent element of a direct-view display 50 that includes a direct-view screen 52, including, but not limited to, a plasma screen.

Output video data (e.g., output video frames) is output from the video processor, typically at a fixed interval after each corresponding input frame is received by the video processor. The duration of the interval between receiving a particular frame and outputting the corresponding processed frame can vary depending on factors such as frame rate, display resolution, buffer size, etc.

During the processing interval, various analysis and pixel processing operations may be performed on the video data. The video processor may include blocks or operators for analyzing and capturing pixel data (block 42), estimating motion (block 44), and performing pixel processing operations (blocks 46, also referred to as image or pixel processing operations or stages). Video Processor 40 typically includes multiple different pixel processing operations, such as deinterlacing, scaling, color processing, etc.

Pixel data from the input video frames may be stored within a memory 48 of video processor 40. Specifically, memory 48 may at least temporarily hold multiple video frames F1, F2, etc. of pixel data. Memory 48 may also at least temporarily hold correlated tag data T1, T2, etc. for the frames. The tag data typically is dynamic and changeable and is non-identical to the pixel data. The tag data can be used to dynamically change the pixel data as the video processor analyzes and modifies both the tag data and the pixel data. For example, tag data T2 may describe a motion property of frame F2, such as whether frame F2 contains a high or low degree of motion. As another example, tag data T2 may additionally or alternatively include information regarding what processing has occurred to frame F2 and/or what processing will occur to frame F2. Tag data may be associated with entire frames of pixel data, or with blocks or other sub-frame regions, or individual pixels. The tag data may be correlated with its corresponding pixel data via pointers, packets or other data structures. Furthermore, tag data that is associated with a particular frame or other target may include information regarding another frame or target that may assist in processing the particular frame or target.

The pixel data and tag data may be stored in various ways within memory 48, and the memory may be configured in any practicable size. At any given time, memory 48 may include many frames worth of pixel data and associated tag data, possibly including data for frames that have already been output from video processor 40. As indicated, video processor 40 may be implemented with an architecture that enables the various components to access any of the pixel data and/or tag data within memory 48. This architecture and the accessibility/sharing of the dynamic tag data among processing stages 46 can be applied to advantage in many different ways. For example, dynamic tag data may be employed to dynamically tune processing at a given processing stage, and to provide image processing that is more targeted, less redundant, more efficient, and of higher quality. Processing time may be dynamically allocated among portions of a video frame, between frames, or among the different processing stages. The architecture and dynamic tag data can be employed to optimize processing order of processing stages, bypass stages, and/or allocate time toward operations yielding higher image quality benefits.

In addition to other types of video analysis and modification, video processor 40 can analyze the video stream to identify any aspects of the video stream that are likely to cause burn-in when video images derived from the video stream are presented on a display. Video processor 40 can also modify the video stream so as to reduce, if not eliminate, burn-in.

Figure 3:
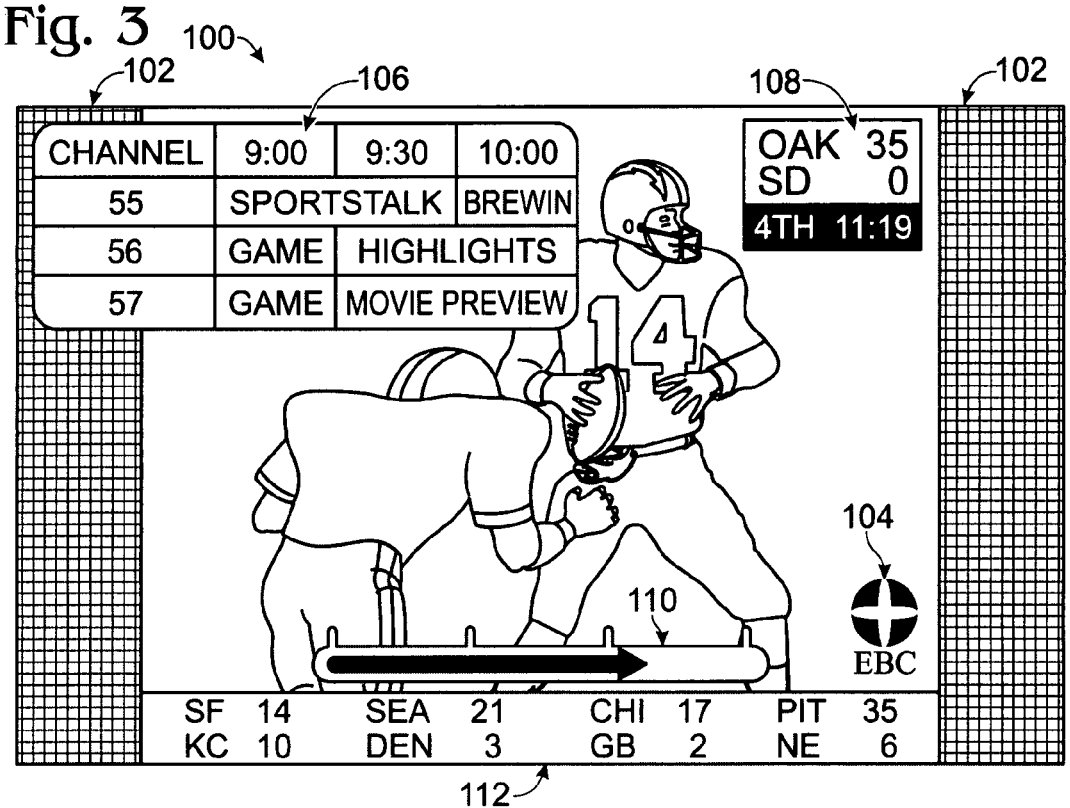
FIG. 3 shows exemplary video output with several potential burn-in problems.

FIG. 3 shows a video output 100 that includes several aspects that are likely to cause burn-in. In particular, the video output includes letterboxing 102, a station identifier, or bug, 104, a program guide 106, a scoreboard 108, a DVR progress bar 10, and a sports ticker 112. At least portions of each of the above listed aspects can remain on the same portion of a display for prolonged periods of time. For example, letterboxing 102 can be present whenever video having one aspect ratio is presented on a display having a different aspect ratio (e.g., presenting a 4:3 video stream on a 16:9 display). Station identifier 104 may be present whenever a particular channel is watched. Program guide 106 and DVR progress bar 110 can be repeatedly accessed by a viewer regardless of the underlying video image that is being presented. A scoreboard 108 and sport ticker 112 can remain stationary for the entire duration of a sporting event, and similar aspects can reoccur at the same location when different sporting events are viewed. Furthermore, video output 100 can be paused so that the exact same video output remains displayed indefinitely.

Figure 4:
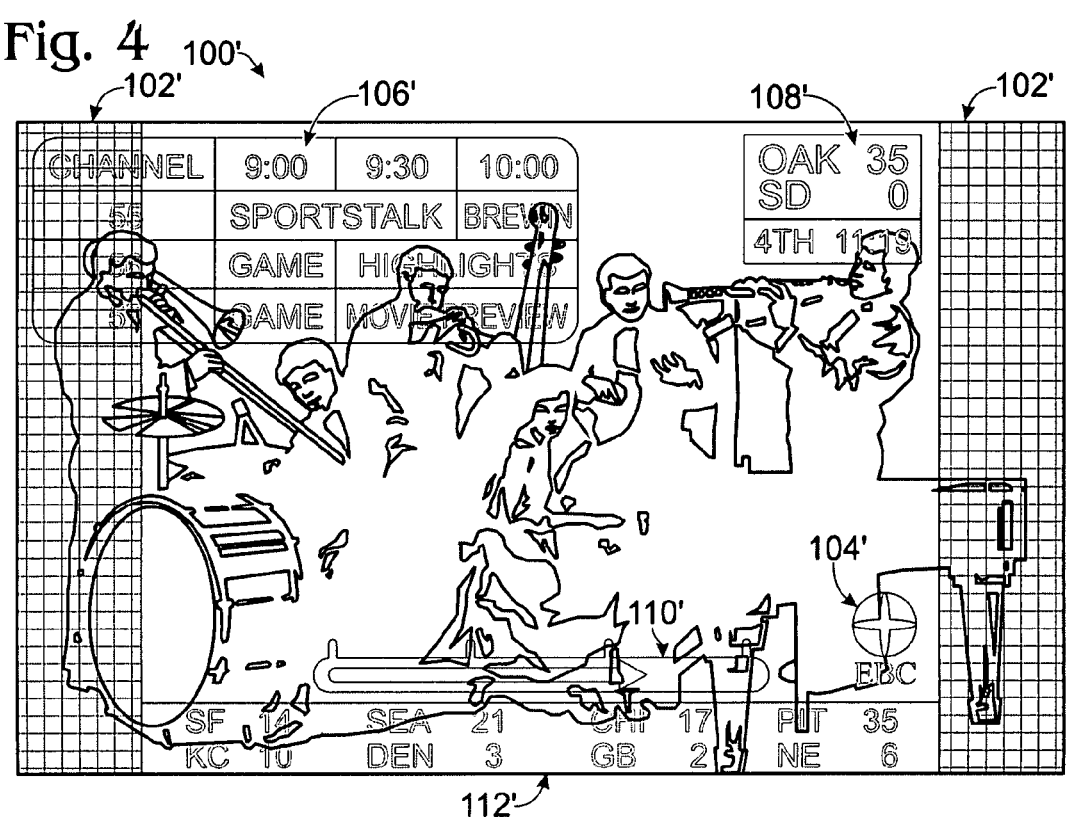
FIG. 4 shows exemplary video output with burn-in resulting from the video output of FIG. 3.

Pixels that continually and/or repeatedly display the same static images can age at a different rate than adjacent pixels displaying dynamic images. This can be particularly true when static regions of the video image sharply contrast adjacent dynamic regions of the video image, and/or the static pixels display certain colors, such as white or blue. For example, FIG. 4 shows a video output 100' that includes undesired burn-in from video output 100 of FIG. 3. In particular, letterboxing burn-in 102', channel identifier burn-in 104', program guide burn-in 106', scoreboard burn-in 108', DVR progress bar burn-in 110', and sport ticker burn-in 112' are unwanted artifacts that should not be displayed. However, uneven pixel aging causes these images to remain regardless of the new video content that is displayed. This can be highly distracting and unsatisfying to a viewer.

Video processor 40 of FIG. 2 can analyze instantaneous and/or sustained motion, contrast, brightness, and/or other parameters of a video stream in order to identify potential burn-in candidates. For example, the video processor can identify where there are areas of sharp contrast in a video image and keep track of whether those areas are continuously changing. If burn-in candidates are identified, the video processor can take preemptive measures to limit burn-in. This analysis and identification can be performed dynamically in real-time. Furthermore, this analysis can be used to identify new types of burn-in candidates as content creators introduce such burn-in candidates into video content. In this manner, video processor 40 is not limited to preventing burn-in for the limited set of burn-in candidates that may exist when the processor is developed.

A video processor can optionally be specifically configured to identify particular aspects of a video image that are anticipated to be burn-in candidates. In other words, well known burn-in problems can be specifically targeted. For example, 4:3 to 16:9 letterboxing may be common, and a video processor can be configured to test for the telltale vertical letterbox edges at the location where the letterboxing typically is displayed. Similarly, many scoreboards and station identifiers are positioned in a corner of a video image as semitransparent overlays. Accordingly, a video processor can be configured to test for semitransparent overlays in the corners of a video image. Channel guides and DVR progress bars are typically displayed in the same location, using the same type of lines and colors. Accordingly, a video processor can be configured to test for those static colors and lines in the particular area where the guide and/or progress bar is expected.

Video Modification

Once potential burn-in candidates are identified, video processor 40 can modify a video stream so as to limit, if not eliminate, uneven pixel aging. A video stream can be modified by a plurality of different processing operations to improve video output. Modifications that will help limit burn-in can be prioritized with other potential modifications. In some instances, modifications that can benefit another facet of video output (e.g., scaling, color correction, sharpening, or motion compensation) can also be used to limit burn-in. In some instances, limiting burn-in may be prioritized above some, or even all, other facets of display output, and the video processor may take aggressive measures that noticeably modify the video stream to limit burn-in. Other times, modifications can be subtle changes that may be unperceivable to a viewer.

Modifications can be spatially made to an entire video frame, one or more selected regions of a video frame, or one or more individual pixels of a video frame. When modifications are made to two or more different regions or pixels, different types of modifications can be made to the different regions or pixels so as to specifically address the potential burn-in problem at each particular location. The video processor may consider the location of a potential burn-in problem in deciding how to address the problem. For example, because a viewer's attention is typically focused near the center of a video image, the video processor may make more dramatic modifications near the edges of a video image to limit burn-in because such modifications are more likely to go unnoticed.

Modifications can be temporally made to all frames in a video stream, selected frames in a video stream, or a single frame in a video stream. Modifications can be made in real-time or near real-time as the video stream is being played on the display. Modifications can additionally or alternatively be made after a video stream has already been played. For example, the video processor can play a stream that is configured to mitigate any uneven pixel aging that may have occurred from a previously played video stream. Such a curing video stream may be played when the display is otherwise not in use, such as during late night hours.

FIGS. 5A-10C schematically show how different modifications can affect video output to reduce the risk of uneven pixel aging and the resulting burn-in. For the purpose of simplicity, all illustrated changes are demonstrated using channel identifier 104 from FIG. 3 on a white background. To provide a frame of reference, a crosshair is centered on the black background. Although each of the below described modifications are illustrated using the channel identifier, it should be understood that some modifications may be made to other burn-in candidates. Furthermore, while each proposed modification is shown independent of other modifications, two or more different modifications can be combined without departing from the scope of this disclosure. The below described modifications are nonlimiting examples of the many possible modifications that can be used to limit burn-in.

Figure 5A:
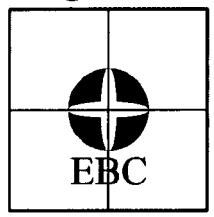
Figure 5B:
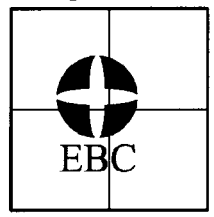
Figure 5C:
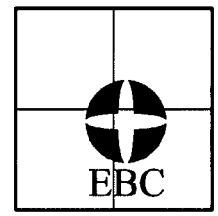

As shown in FIGS. 5A-5C, video processor 40 can modify a video stream by spatially shifting at least an identified burn-in candidate to limit uneven aging of the display pixels used to present the burn-in candidate (and/or pixels near the burn-in candidate). In particular, the channel identifier is moved so that different pixels are used to form the channel identifier. The video processor can identify the channel identifier by analyzing the edges of the identifier, the lack of motion of the identifier relative to other aspects of the video image, the contrast between the identifier and adjacent portions of the video image, etc.

Once the channel identifier is identified, it can be selectively moved in a pattern so that the same pixels are not continually displaying the channel identifier in a manner that will cause those pixels to age faster than nearby pixels (or vice versa). The movement pattern can be preprogrammed and not be particularly tuned to the particular burn-in candidate, or alternatively, the movement pattern can be calculated to intelligently limit burn-in risk based on the actual parameters of a particular burn-in candidate. As can be appreciated by comparing the position of the channel identifier to the crosshair, a burn-in candidate can be moved independent of other aspects of a video image. Alternatively, an entire frame (or several sequential frames) can be moved so that the burn-in candidate moves with the rest of the video image.

When a burn-in candidate is spatially moved, the video processor can guess what should be displayed on the pixels from which the candidate has moved. For example, if the channel identifier is on a solid background, the solid background can fill in the space from where the channel identifier is moved. If the channel identifier is on a more irregular background, the video processor can calculate a fill that minimizes disruptions in edges, colors, and/or textures in the space from where the channel identifier is moved.

Figure 6A:
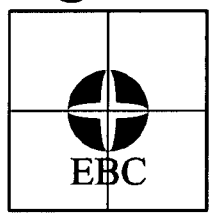
Figure 6B:
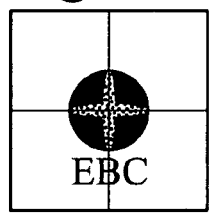
Figure 6C:
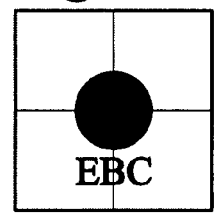

FIGS. 6A-6C schematically show how video processor 40 can shift colors to limit burn-in. The color of the pixels used to display a burn-in candidate can be made to continuously shift, shift in discrete steps and remain for set durations, or shift in discrete steps and remain until cued by other changes in the video image (e.g., a scene change). The modified color values may be selected to mitigate burn-in effects. For example, the pixels near the edges of a burn-in candidate can be shifted for decreased contrast relative to neighboring pixels, and the pixels at the interior of the burn-in candidate can be shifted to minimize contrast throughout the burn-in candidate.

Figure 7A:
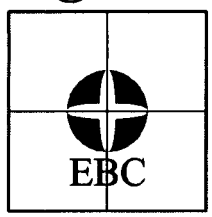
Figure 7B:
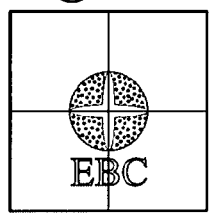
Figure 7C:
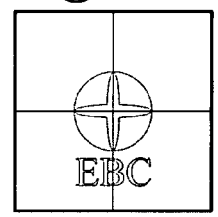

FIGS. 7A-7C schematically show how a video stream can be modified by washing out, or camouflaging, a burn-in candidate. In other words, a burn-in candidate can be made to look at least semitransparent, to decrease contrast with surrounding pixels, or to otherwise blend in with the surrounding video image.

Figure 8A:
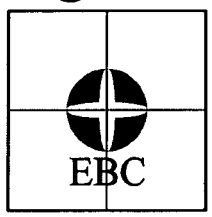
Figure 8B:
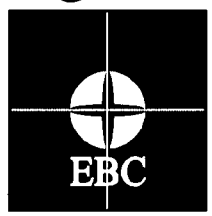

FIGS. 8A and 8B schematically show how a video stream can be modified by inverting a burn-in candidate. Such an approach may be particularly effective for program guide and device menu screens that are repeatedly presented on the display regardless of the video content that is being presented. For example, a DVR menu and program guide may be repeatedly used to select the video streams that are actually played by the display. Video processor 40 can be configured to recognize frequently occurring burn-in candidates, such as these, and color-invert the burn-in candidates at least some of the time (e.g., every other time a program guide is accessed). The video processor may also recognize a burn-in candidate and present it unmodified during a viewing session, and then during a curing session (e.g., when the display is not otherwise being used), the video processor may cause the display to present an color-inverted burn-in candidate to mitigate any burn-in harm that has occurred.

Figure 9A:
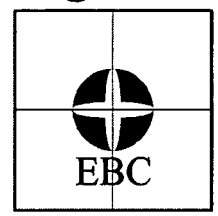
Figure 9B:
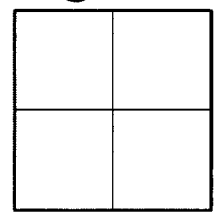

FIGS. 9A and 9B show how a video stream can be modified by blacking out a burn-in candidate. An entire frame can also be blacked out. As used herein, "black out" includes displaying black color pixels, as well as not displaying any colors in the pixels (i.e., turning the pixels off). Such an approach may be particularly appropriate if, for instance, a program guide or device menu is statically displayed for prolonged periods of time. Such menus and guides do not typically need to be displayed without any changes for prolonged times, therefore a static menu or guide suggests that a viewer is no longer paying attention to the display. As such, the entire video image can be blacked out until the viewer returns and causes the video stream to change (e.g., presses a button on the display or on a remote control). Some program guides and device menus present video images that have background motion. A video processor 40 can be designed to recognize and ignore such background motion, thus allowing an inactive menu or guide to be blacked out. Because the video processor is configured to analyze any input video content, the video processor is not limited to blacking out only menus originating from the home device of the video processor, but instead can black out unfamiliar guides or other unfamiliar aspects of video content originating from external sources.

Figure 10A:
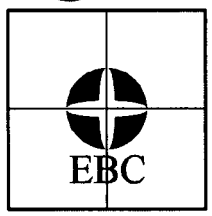
Figure 10B:
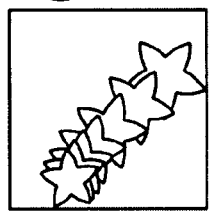
Figure 10C:
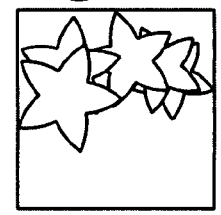

FIGS. 10A-10C show an alternative to blacking out an entire frame, namely displaying a screen saver. Unlike some screen savers that are activated by a content source device, the screen saver shown in FIGS. 10A-10C is activated by video processor 40 when the video processor analyzes the particular video content being displayed and recognizes that the video content is likely to cause burn-in.

Video Output

Once modified, the video stream is output for presentation on the display. The video stream may be further processed for compatibility with a particular display (e.g., delivered at 480$i$, 480$p$, 720$i$, 720$p$, 1080$i$, 1080$p$, etc.). The video output can also be delivered with scaling adapted for a particular display. When letterboxing is necessary, the video stream can be output with letterboxes that can limit burn-in. For example, the letter boxes can include a fine checkerboard of different color pixels that continually color-inverts so that no single pixel remains the same color for prolonged periods of time. Although the individual pixels are changing colors (e.g., black to white to black to white, etc.), the collective letterbox can appear to be a static color (e.g., gray). The edge of the letterbox can additionally or alternatively be spatially shifted, either at set intervals or cued to other aspects of the video stream (e.g., at scene changes).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, while disclosed in the context of a tag based architecture, it should be understood that the present disclosure applies equally well to any architecture in which a video stream can be analyzed for potential burn-in candidates, and in which the video stream can be modified to limit the uneven aging of display pixels from the identified burn-in candidates.

The invention claimed is:

1. A burn-in limiting video processor, comprising:
an input for receiving video content;
analysis logic for analyzing the received video content to identify potential burn-in candidates in the received video content;
modification logic to modify at least some of the video content to mitigate adverse effects of the identified burn-in candidates, where the modification logic spatially shifts at least some identified burn-in candidates without spatially shifting other portions of the video content, and calculates a fill to reduce at least a portion of a texture disruption in a region corresponding to a region previously occupied by at least a portion of a spatially-shifted burn-in candidate; and
an output for outputting the modified video content.

2. The burn-in limiting video processor of claim 1, where the modification logic further color shifts at least some identified burn-in candidates.

3. The burn-in limiting video processor of claim 2, where the modification logic color shifts at least some identified burn-in candidates without color shifting other portions of the video content.

4. The burn-in limiting video processor of claim 1, where the modification logic further camouflages at least some identified burn-in candidates.

5. The burn-in limiting video processor of claim 1, where the modification logic further blacks out at least a portion of the video content.

6. The burn-in limiting video processor of claim 1, where the modification logic further replaces the video content with a screen saver.

7. The burn-in limiting video processor of claim 1, where the analysis logic identifies potential burn-in candidates at least in part by searching for static pixels.

8. The burn-in limiting video processor of claim 7, where the analysis logic identifies potential burn-in candidates at least in part by searching for static pixels adjacent pixels that contrast the static pixels.

9. The burn-in limiting video processor of claim 1, where the analysis logic and the modification logic are embodied on a common integrated circuit.

10. The burn-in limiting video processor of claim 9, further comprising at least one of motion estimation logic, deinterlacing logic, scaling logic, and color processing logic, and where the analysis logic, the modification logic, and the at least one of motion estimation logic, deinterlacing logic, scaling logic, and color processing logic are embodied on a common integrated circuit.

11. A method of limiting display burn-in, comprising:
receiving a video stream;
analyzing the video stream to identify potential burn-in candidates;
modifying the video stream so as to spatially shift at least some identified burn-in candidates without spatially shifting video content adjacent the identified burn-in candidates so as to mitigate adverse effects of the identified burn-in candidates;
calculating a fill to reduce at least a portion of a texture disruption in a region corresponding to a region previously occupied by at least a portion of a spatially-shifted burn-in candidate; and
outputting the modified video stream.

12. The method of claim 11, where modifying the video stream includes color shifting at least some identified burn-in candidates.

13. The method of claim 12, where modifying the video stream includes color shifting at least some identified burn-in candidates without color shifting video content adjacent the identified burn-in candidates.

14. The method of claim 11, where modifying the video stream includes camouflaging at least some identified burn-in candidates.

15. The method of claim 11, where modifying the video stream includes blacking out at least a portion of the video content.

16. The method of claim 11, where modifying the video stream includes replacing the video content with a screen saver.

17. A display, comprising:
a screen; and
a video processor operatively connected to the screen, the video processor including:
analysis logic for analyzing video content to be displayed by the screen so as to identify candidates likely to cause burn-in on the screen; and
modification logic to modify at least some of the video content so as to limit burn-in on the screen, where the modification logic spatially shifts at least some identified burn-in candidates without spatially shifting other portions of the video content and calculates a fill to reduce at least a portion of a texture disruption in a region corresponding to a region previously occupied by at least a portion of a spatially-shifted burn-in candidate.

* * * * *